United States Patent [19]

Luke

[11] 4,270,669
[45] Jun. 2, 1981

[54] POT SEPARATOR

[76] Inventor: Virgil E. Luke, 4217 McCann Rd., Vancouver, Wash. 98665

[21] Appl. No.: 928,610

[22] Filed: Jul. 27, 1978

[51] Int. Cl.³ .............................................. B65G 59/06
[52] U.S. Cl. ..................................... 221/13; 221/221; 221/247
[58] Field of Search ................... 221/13, 22, 195, 210, 221/220, 221, 222, 223, 247, 248, 267, 295, 297, 298; 47/1 A, 1 R

[56] References Cited

U.S. PATENT DOCUMENTS

| | | | |
|---|---|---|---|
| 1,093,976 | 4/1914 | Claussen | 221/267 X |
| 1,907,713 | 5/1933 | Benson | 221/222 |
| 2,017,521 | 10/1935 | Whiting | 221/221 |
| 2,550,884 | 5/1951 | Tandler et al. | 221/13 |
| 3,298,565 | 1/1967 | Cease | 221/13 |
| 3,410,452 | 11/1968 | Igel et al. | 221/13 |
| 3,415,416 | 12/1968 | Broersma et al. | 221/221 |
| 3,477,592 | 11/1969 | Kuhlman | 221/221 X |
| 3,770,143 | 11/1973 | Breitbach | 271/18 A X |
| 3,842,533 | 10/1974 | Mayer | 221/298 X |

*Primary Examiner*—F. J. Bartuska
*Attorney, Agent, or Firm*—Klarquist, Sparkman, Campbell, Leigh, Whinston & Dellett

[57] ABSTRACT

An apparatus is disclosed for separating and dispensing nursery pots which are nested in a stack. The apparatus includes a ratchet mechanism which allows the stack to move in only one direction along a predetermined path, an elongated bar mechanism for engaging the first pot at one end of the stack and pulling it away from the pots in the stack and a contact off switch which responds to the presence of a pot at a dispensing location along said path to deactivate the bar mechanism until such time as the pot is removed by the operator.

5 Claims, 3 Drawing Figures

POT SEPARATOR

BACKGROUND OF THE INVENTION

The present invention relates to apparatuses for separating nested containers and more specifically relates to a device for automatically dispensing containers from a stack of nested plastic or metal nursery pots.

Such nursery pots are typically delivered from their manufacturer in stacks each of which contains multiple nested pots. For ease of handling, and to obtain the maximum amount of compactness during the transporting of these bulky articles, the pots are pressed tightly together so that substantial effort is required to separate pots from the stack prior to use. It is a most common practice to use a considerable amount of manual labor for separating such pots.

Although a variety of prior apparatuses have been devised for separating and dispensing nested containers, each of these prior devices has been exceedingly complex and costly so that their use for separating nursery pots would be impractical.

One such prior device which is specifically designed for separating nursery pots, is the pot dispenser shown in U.S. Pat. No. 3,415,416 (Broersma et al, Dec. 10, 1968). This prior device is a complicated apparatus that includes numerous moving parts such as pinching and swinging arms and complex multi-surfaced cams.

SUMMARY OF THE INVENTION

The present invention is a simple, portable apparatus for separating pots. Two vertical rails define a path along which pots can move in only one direction. A landing or receiving area is provided at one end of the path for pots which are separated from the stack.

Pairs of spring loaded pawls hold the stack in a position away from the receiving area until it is desired that a pot be separated from the stack and moved to the landing. At that time, elongated gripper bars are moved toward the stack to release the pawls holding the first pot in the stack and to grip that pot. Thereafter, the bars reverse direction and pull the first pot, along with the rest of the stack, towards the receiving area until the second pot in the stack is restrained by the pawls. As the bars continue to move away from the stack, the first pot is pulled away from the remainder of the stack to the receiving location where it may be easily removed by the nuseryman using the apparatus. A mechanism is provided for sensing the pot at the dispensing location so that the next pot in the stack is not moved to that position until the first pot is removed.

It is thus an object of this invention to provide a pot separating apparatus that contains a minimum of parts and is light weight and thus completely portable.

Accordingly, it is an object of this invention to provide such a pot separator which can be operated without use of complicated cams or hydraulic drive systems.

A further object is to provide such an apparatus which operates automatically and yet requires a minimum of electrical circuitry.

An additional object is to provide such an apparatus with a simple pawl mechanism for retaining a stack of nested pots at a desired location relative to the apparatus.

These and other objects will be apparent from the following description.

DESCRIPTION OF THE PREFERRED EMBODIMENT

Figure 1:
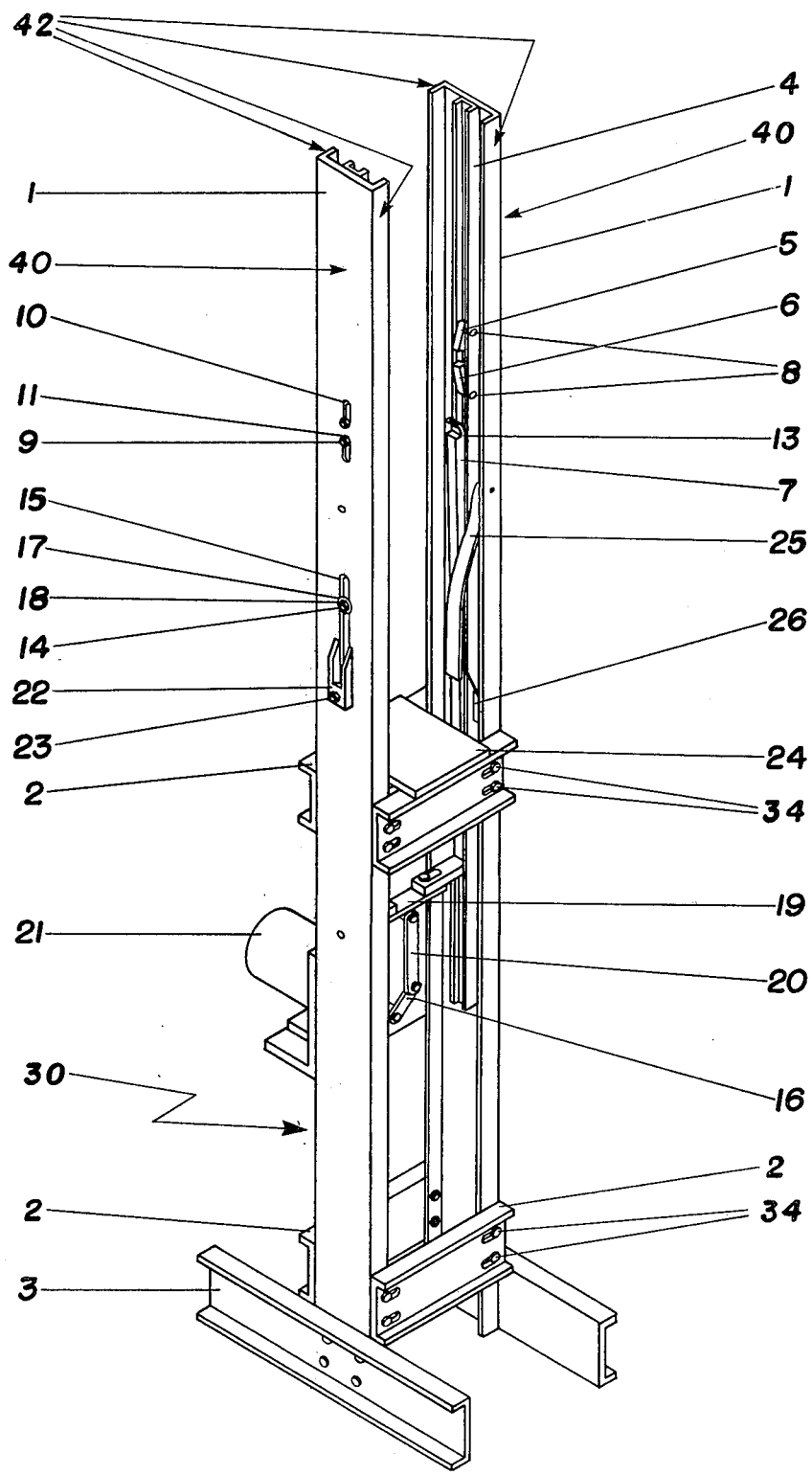
FIG. 1 is an isometric view of a pot separator according to the present invention.

The present invention will be best understood by referring to the drawings which show a pot separator according to the present invention. The apparatus includes a frame 30 which comprises two vertical channel members 1 separated and maintained in a parallel relationship by cross members 2 extending therebetween. The cross members 2 are secured to the channel members 1 by bolts 34 which extend through horizontal slots 36 defined in the cross members 2. Such slots provide means for adjusting the horizontal spacing of the members 1 so that pots of varying diameters can be separated by the apparatus. Horizontal support members 3 are bolted to the channel members 1 to serve as a base for the apparatus.

The channel members 1 are the side member of the frame 30 and have web portions 40 and side flanges 42, each of the channel members 1 being positioned such that its side flanges 42 project toward the opposite side member. So oriented, the channel members 1 define a vertical path for pot travel which has an upstream end at the uppermost end of the channel members 1 and a downstream end defined by a platform 24 which extends between two of the cross members 2.

Fastened on the inner face of each base flange 40 is an inner channel member 4 of smaller depth and width than channel member 1. The inner channel members 4 are centered between the side flanges 42 of the channel members 1 and positioned to extend parallel to the side members with the side flanges of each inner channel member 4 extending in the same direction as the side flanges 42 of the channel member 1 to which it is bolted.

The inner channel members 4 provide support for positioning mechanisms which maintain one end of a stack of nested pots at a predetermined location along the path and also for separation mechanisms which separate a first pot in the stack from the remaining pots and move the separated pot to the machine's dispensing location which is at the downstream end of the path.

The positioning mechanism comprise two sets of spring loaded pawls which are mounted on the frame 30 at diametrically opposed locations at a position along said path. Each set includes an upper or upstream pawl 5 mounted between the side flanges of the inner channel 4 by means of an axle pin 8. So mounted, each upstream pawl 5 can swing between a first position wherein the pawl extends downwardly into the path of pot travel at an acute angle thereto and a second position between the side flanges of the adjacent inner channel member 4 wherein it is out of the path of pot travel.

In a similar fashion a lower or downstream pawl 6 is pivotally mounted in each inner channel member 4 for swinging movement between a first position wherein the downstream pawl 6 extends upwardly into the path of pot travel at an acute angle thereto and a second position inside the adjacent inner channel member 4, in which position the downstream pawl is out of the path of pot travel. Welded to each of the pawls is a stud 9 which extends through a loosely fitting opening defined in the channel members 1 and 4 so that the studs may move back and forth therethrough without binding. A spring 10 is provided between each pawl and its adjacent inner channel 4 to urge the pawl into the path of pot travel. Threaded onto the free end of each stud 9 is a nut 10 which adjustably limits the distance to which the pawl can extend inwardly and which controls the tension of its associated spring 10.

Figure 2:
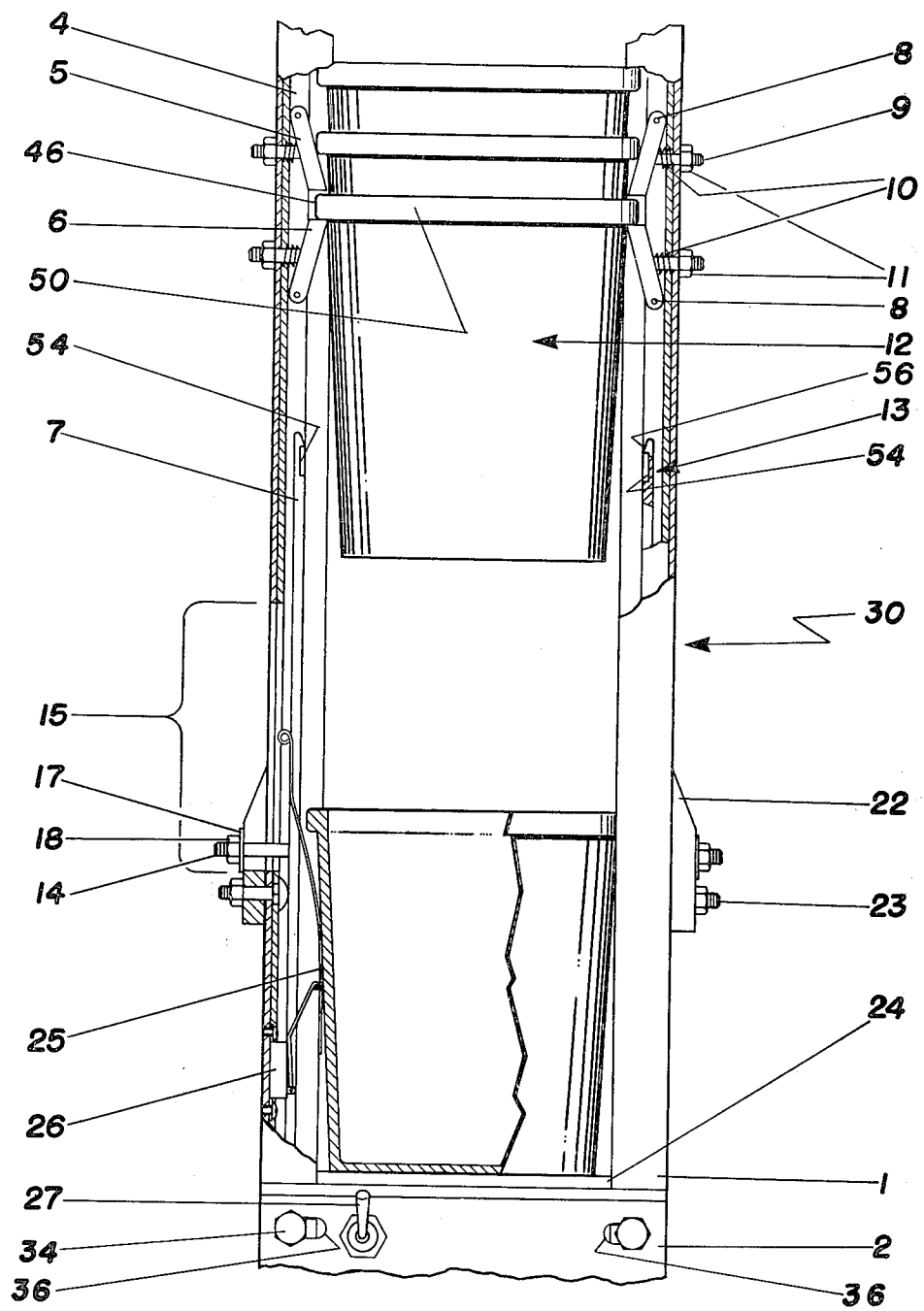
FIG. 2 is a partial front elevation of the pot separator with a portion of its frame broken away to show a pair of elongated gripper bars in a retracted position.
Figure 3:
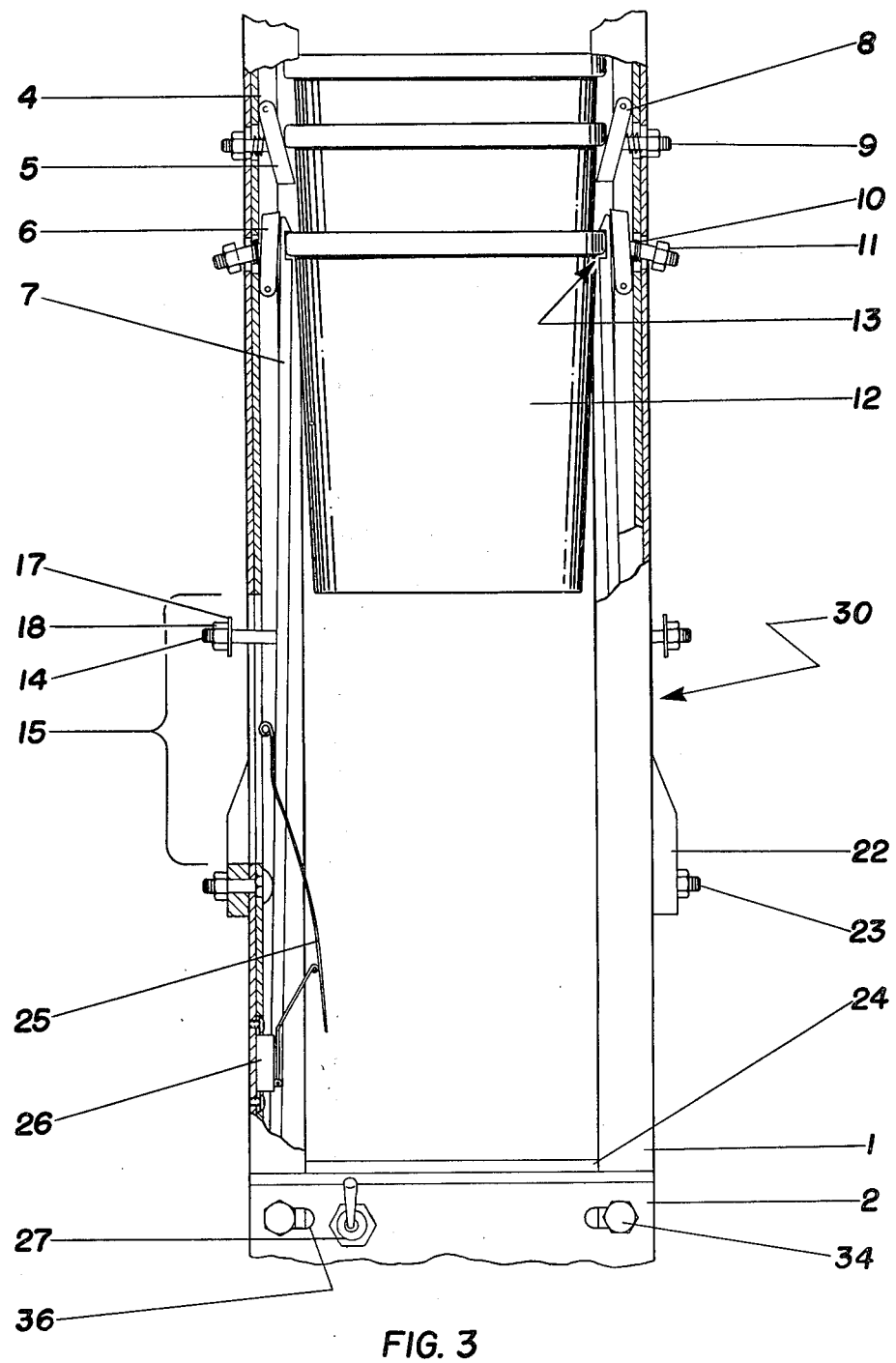
FIG. 3 is a partial front elevation of the pot separator with a portion of its frame broken away to show the bars in a fully extended position.

Because the upstream pawls 5 face downwardly and are urged into the path of pot travels, they serve as ratchets which allow a stack of pots to move downwardly between the members 1, but not in reverse direction. If properly adjusted all of the pawls will be located in their first positions when the machine is at rest so that a space 46 is defined between the free ends of the pawls in each set as shown in FIG. 2.

When a stack of nested pots 12 is inserted into the path of pot travel between the channel members 1, a circumferential flange 50 which extends radially from the first pot in the stack is received in the space 46 and thus retained at a predetermined location along the path. The upstream pawls 5 are moved aside to allow the flange 50 to pass thereby, but the upwardly extending free ends of the downstream pawls 6 limit the downward travel of the stack.

The separation mechanisms include two diametrically opposed elongated gripper bars 7 which are slidably mounted in the inner channel members 4, one bar beneath each of the downstream pawls 6. The upper end or head 13 of each gripper bar includes a horizontal notch or detent 54 which faces inwardly. The uppermost side of the notch is defined by a lip 56 which projects inwardly from a point adjacent the uppermost end of the elongated bar 7.

As will be further explained below, a pot to be separated from the stack is caused to be retained or released by the separation mechanism by moving the elongated bars 7 radially toward or away from the longitudinal axis of the pot. Accordingly, a release mechanism is provided to control the radial movement of each elongated bar 7. Each release mechanism consists of a stud 14 which extends outwardly from one of the elongated bars 7 through a long vertical slot 15 through the web portions of the nearest channel member 1 and inner channel member 4. This slot is of sufficient length that vertical travel of the stud 14, which moves with the elongated bar 7, is not impeded. A washer 17 of greater diameter than the width of the slot 15 is provided on the stud 14 outwardly of the channel member 1; and a nut 18 is threaded onto the stud 14 to retain the washer 17 in place.

The washer 17 serves as a cam follower which rides over the outwardly facing surfaces of a cam 22 which is fastened to the outer face of the base flange 40 at the lower end of the slot 15 by means of a bolt 23. The cam 22 extends to a sufficient distance outwardly of the base flange 40 that, as the elongated bar 7 moves to its lowest position, the bar 7 is pulled outwardly until it is completely contained within the inner channel member 4 so that it is located outside the path of pot travel.

A drive mechanism is provided for imparting reciprocating vertical motion to the elongated bars 7. This mechanism includes a geared motor 21 which drives a crank arm 16 on the motor shaft. The crank 16 is pivotally connected to a connecting rod 20 which in turn connects to a horizontal batten plate 19. The batten plate 19 connects to lower portions of each of the bars 7. With this arrangement it will be apparent that a single motor 21 can synchronously drive both the elongated bars 7 in a reciprocating movement.

To control the operation of the motor 21, a sensing mechanism is provided to detect the presence of a pot at the dispensing location above the platform 24. In the illustrated embodiment, this mechanism is a trigger 25 mounted on the frame 30 at a position just above the platform 24. When a pot is located in the dispensing position, as shown in FIG. 2, the trigger 25 is pressed outwardly to activate a disconnect switch 26 which opens an electrical circuit that provides electrical power to the motor 21. A manually operated on-off switch 27 is also provided on the frame 30 so that the operator can open the electrical circuit to the motor when the apparatus is not in use.

OPERATION

To separate a stack of nested nursery pots using the above described apparatus, a stack of pots is first loaded into the top of the apparatus between the channel members 1 in the orientation shown in the upper half of FIG. 2. As the stack of pots moves downwardly, the lowermost pot 12 proceeds until its circumferential flange 50 moves past the upstream pawls 5 and is received in the space 46. At this point, the free ends of the downstream pawls 6 abut a downwardly facing surface of the flange 50 to prevent further downward travel of the stack.

To cause the separation of a pot from the stack, an operator moves the on-off switch 27 to the "on" position. If there is not a container resting on the platform 24, the motor 21 is immediately activated to commence a vertical, reciprocating, sliding movement of the elongated bars 7. As the crank 16 rotates, the elongated bars 7 are moved upwardly inside the channels 4 until the uppermost ends of the bars 7 come into contact with the downstream pawls 6.

As they continue to move upwardly, the elongated bars 7 push the downstream pawls 6 upwardly into their second positions and simultaneously ride outwardly over the flange 50 until the lip portions 56 are located above an upwardly facing surface of the flange 50 and the flange itself is received by the detent 54. All during the upward movement of the bars 7, upstream pawls 5 remain in their first or outer positions to prevent the first pot 12 from moving upwardly past their free ends.

Further rotation of the crank shaft 16 causes the bars 7 to change direction and slide downwardly pulling the entire stack of pots downwardly. As soon as the bars 7 descend to a position below the downstream pawls 6, those pawls automatically return to their first position, in the path of pot travel, where they serve as stops to prevent the second pot in the stack from descending. Thus, as the first pot moves downwardly with the bars 7, it is pulled free from the remainder of the stack which is retained above the downstream pawls 6.

As the bars 7 approach their lowermost position, the washers 17 come into contact with and ride over the outer surfaces of the cam 22. This action causes the bars 7 to be pulled outwardly into the channel members 4 thereby releasing the rim 50 from the detents 54. When released, the pot 12 drops by gravity to the platform 24 where it remains until it is removed by the operator.

When a pot is present on the platform 24, the disconnect switch 26 is opened as previously described. This deactivates the motor 21 until the container on the platform 24 is removed. Removal of the pot causes the disconnect switch 26 to close and automatically reactivate the motor 21 to repeat the sequence.

While a preferred embodiment of the invention is shown and described, it will be apparent to those skilled in the art that changes and modifications may be made without departing from the invention in its broader aspects. Therefore, the scope of the present invention should only be determined by the scope of the following claims.

I claim:

1. An apparatus specifically adapted for separating and dispensing nested nursery pots, having radially extending flange members, from a stack of such pots, said apparatus comprising:
   a frame constructed to receive a stack of nested nursery pots to be separated and to define a path for pot travel axially of the stack;
   positioning means for maintaining said stack in a fixed position with one end thereof at a predetermined location along said path;
   a separation mechanism adapted to move a first pot at said one end of said stack to a dispensing location on said path away from said stack, said mechanism including at least one elongated member that:
   a. is located to extend alongside and substantially parallel to said path,
   b. is mounted to said frame for movement in a direction substantially parallel to said path, and
   c. defines a detent which faces said path and which is positioned at a location along said elongated member so that movement of said elongated member toward said stack causes said first pot to be pulled away from said stack causes a flange member, extending radially from said first pot, to be received and retained by said detent and so that subsequent movement of said elongated member away from said stack and to be carried and supported by said elongated member for at least a portion of the distance between said predetermined location and said dispensing location;
   drive means for imparting reciprocating motion to said elongated member; and
   release means for moving at least a portion of said elongated member radially outwardly from said first pot as said pot approaches said dispensing location so that said flange member is released from said detent and said first pot ceases to be carried and supported by said elongated member.

2. The apparatus of claim 1 wherein said release means comprises a cam and cam follower, one of which is connected to said elongated member and the other of which is mounted on said frame, said cam being shaped to lead said elongated member radially outwardly from said path as said bar moves said pot toward said dispensing location.

3. An apparatus for separating and dispensing nested nursery pots from a stack, said apparatus comprising:
   a frame constructed to receive a stack of nested pots each having a radially extending flange member, said frame defining a vertical path for pot travel axially of said stack, which path has an upstream end at its top and a downstream end at its bottom;
   two positioning means mounted at diametrically opposed locations along said path for maintaining one end of said stack at a predetermined location along said path, each said positioning means including:
   a. an upstream pawl pivotally mounted at one end to said frame for swinging movement between a first position wherein said upstream pawl extends downwardly into said path at an acute angle thereto and a second position out of said path,
   b. a spring connected between said upstream pawl and said frame to urge said upstream pawl toward its said first position such that said upstream pawl and a stack of pots received by said frame together form a ratchet so that pots can move past said upstream pawl only in a downward direction,
   c. a downstream pawl, located a small distance below said upstream pawl, and pivotally mounted at one end to said frame for swinging movement between a first position wherein said downstream pawl extends upwardly into said path at an acute angle thereto and a second position out of said path, said pawls being located so that when said upstream and downstream pawls are both in their said first positions, a space is defined between the free ends of said adjacent pawls, which space is of sufficient size to receive and retain a pot's flange member whereby said one end of said stack can be maintained at said predetermined location by locating, in said space, the flange of the first pot at said one end of said stack, and
   d. a spring which is connected between each said downstream pawl and said frame to urge said downstream pawl toward its said first position;
   two separation mechanisms respectively mounted at diametrically opposed locations below said downstream pawls, for separating said first pot from said stack and moving it to a dispensing location at said downstream end, each said separation mechanism including an elongated bar located to extend alongside and substantially parallel to said path, said bar defining a detent which faces the longitudinal axis of said path and is located near said uppermost end of said elongated bar, said bar being mounted sufficiently close to said path that upward movement of said bar substantially parallel to said path causes the downstream pawl above said bar to be pushed into said second position by said uppermost end and causes said detent to receive and retain the flange of said first pot, which first pot is prevented by said upstream pawl from being pushed upwardly by said bar and that subsequent downward movement of said bar causes said first pot to be pulled away from said stack and allows said downstream pawl to return to its said first position immediately after said first pot's flange passes thereby so that the remaining pots in said stack are carried downwardly with said first pot only until the flange of the pot, which immediately succeeds said first pot, contacts said downstream pawl which blocks further downward movement of said immediately succeeding pot;
   two release means, one operably connected to each said bar for releasing said first pot's flange from said detents as said bars approach their lowermost positions, each said release means including:
   a. a cam follower connected to one of said bars, and b. a cam on said frame, said cam being shaped to lead said follower and said bar connected thereto radially outwardly from said longitudinal axis as said one of said bars moves said pot toward said dispensing location; and drive means for imparting reciprocating motion to said bars, said drive means including:
  a. a motor,
  b. a shaft driven by said motor,
  c. a crank extending radially from said shaft, and
  d. a connecting rod mechanism pivotally mounted at one end to said crank and at the other end to both said elongated bars in such a manner that said motor can synchronously drive said bars in a reciprocating movement.

4. An apparatus for separating and dispensing nested pots from a stack, said apparatus comprising:

a frame constructed to receive a stack of nested pots to be separated and to define a path for pot travel axially of the stack;

positioning means for maintaining said stack in a fixed position with one end thereof at a predetermined location along said path, said positioning means including a downstream pawl pivotally mounted to said frame and having a free end which faces upstream, said pawl being mounted for movement between a first position wherein said pawl extends at an acute angle into said path to prevent downward movement of pots and a second position in which said pawl is outside of said path, said pawl being biased toward said first position and having a camming surface which faces downstream;

a separation mechanism adapted to move a first pot at said one end of said stack to a dispensing location on said path away from said stack, said mechanism including at least one elongated member that:
  a. is located to extend alongside and substantially parallel to said path,
  b. includes gripper means adapted to grasp and subsequently release said first pot,
  c. is mounted to said frame for movement in a direction substantially parallel to said path, and
  d. includes a camming surface which faces upstream to engage said camming surface on said pawl so that as said elongated member moves toward said stack, said elongated member pushes said pawl and said free end of said pawl is moved outwardly and upstream to be entirely out of contact with said stack; and drive means for imparting reciprocating motion to said elongated member.

5. An apparatus for separating and dispensing nested nursery pots from a stack, said apparatus comprising:

a frame constructed to receive a stack of nested pots each having a radially extending flange member, said frame defining a path for pot travel axially of said stack, which path has an upstream end and a downstream end;

an upstream pawl pivotally mounted at one end to said frame for swinging movement between a first position wherein said upstream pawl extends downwardly into said path at an acute angle thereto and a second position out of said path;

means to urge said upstream pawl toward its said first position such that said upstream pawl and a stack of pots received by said frame together form a ratchet so that pots can move past said upstream pawl only in a downward direction;

a downstream pawl which is located a small distance below said upstream pawl, has a camming surface which faces downstream and is pivotally mounted at one end to said frame for swinging movement between a first position wherein said downstream pawl extends upwardly into said path at an acute angle thereto and a second position out of said path, said pawls being axially aligned and located so that when said upstream and downstream pawls are both in their said first positions, a space is defined between the free ends of said adjacent pawls, which space is of sufficient size to receive and retain a flange member of a pot whereby one end of said stack can be maintained at a predetermined location along said path by locating, in said space, the flange member of the first pot at said one end of said stack;

means to urge said downstream pawl toward its said first position;

a separation mechanism for separating said first pot from said stack and moving said first pot to a dispensing location at said downstream end, said separation mechanism including at least one elongated member that:
  a. is located to extend alongside and substantially parallel to said path,
  b. is mounted to said frame for movement in a direction substantially parallel to said path,
  c. defines a detent which faces said path and which is positioned at a location along said elongated member so that movement of said elongated member toward said stack causes said flange member of said first pot to be received and retained by said detent and so that subsequent movement of said elongated member away from said stack causes said first pot to be pulled away from said stack and to be carried and supported by said elongated member for at least a portion of the distance between said predetermined location and said dispensing location, and
  d. includes a camming surface which faces upstream to engage said camming surface on said downstream pawl so that as said elongated member moves toward said stack, said elongated member pushes said pawl to its said second position and said free end of said downstream pawl is moved outwardly and upstream to be entirely out of contact with said stack;

release means for moving at least a portion of said elongated member radially outwardly from said first pot as said first pot approaches said dispensing location so that said flange member is released from said detent and said first pot ceases to be carried and supported by said elongated member;

drive means for imparting reciprocating motion to said elongated member; and sensing means mounted on said frame for detecting the presence of a single pot at said dispensing location, said sensing means comprising an arm which normally extends to a position within said path and which is constructed to be urged outwardly by said first pot as said first pot approaches said dispensing location, said arm being operably connected to said drive means in such a manner that, when said arm is urged outwardly, said drive means is deactivated and, when said arm is in said position within said path, said drive means is automatically activated to cause said separation means to move said first pot to said dispensing location.

* * * * *

UNITED STATES PATENT AND TRADEMARK OFFICE
CERTIFICATE OF CORRECTION

PATENT NO. : 4,270,669
DATED : June 2, 1981
INVENTOR(S) : VIRGIL E. LUKE

It is certified that error appears in the above-identified patent and that said Letters Patent are hereby corrected as shown below:

Column 2, line 53, "mechanism" should be --mechanisms--.

Column 5, lines 34 and 35, after "stack" delete --causes said first pot to be pulled away from said stack--.

Column 5, line 39, After "stack" add --causes said first pot to be pulled away from said stack--.

Signed and Sealed this

Fourth Day of August 1981

[SEAL]

Attest:

GERALD J. MOSSINGHOFF

Attesting Officer Commissioner of Patents and Trademarks